Sept. 20, 1971  MITSUO MATSUI  3,606,115
APPARATUS FOR PRODUCING THERMOPLASTIC RESIN SPLIT YARNS
Filed Dec. 20, 1968  5 Sheets-Sheet 2

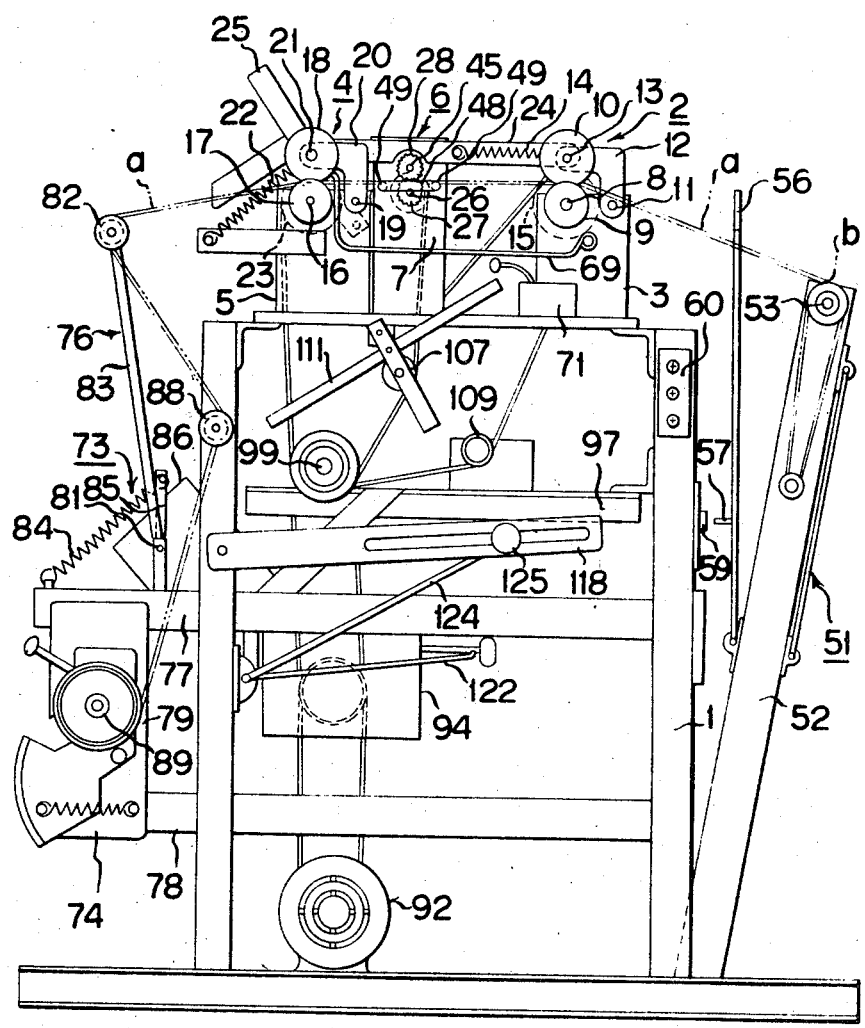

INVENTOR
MITSUO MATSUI
BY
ATTORNEYS

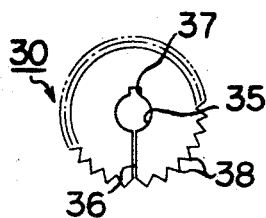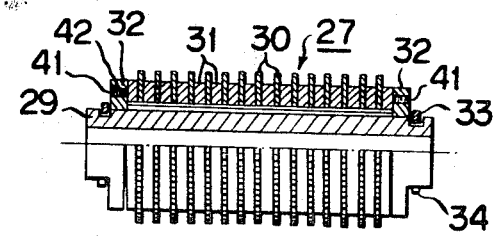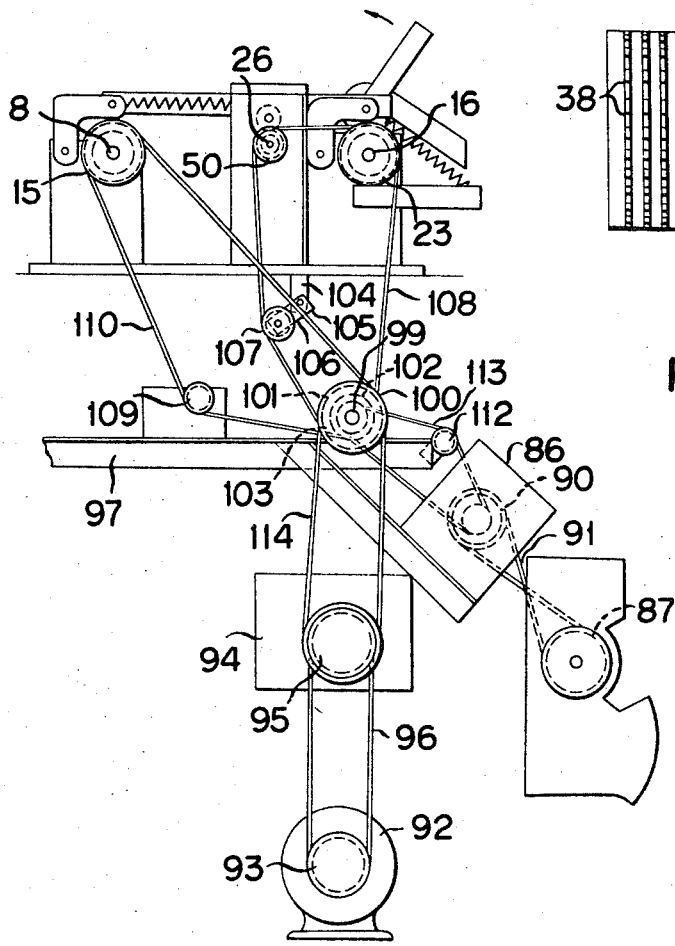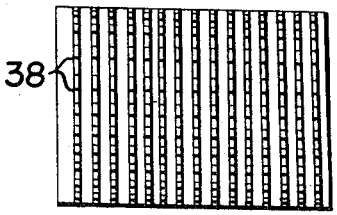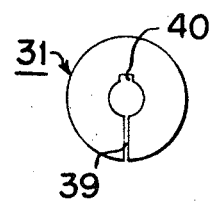

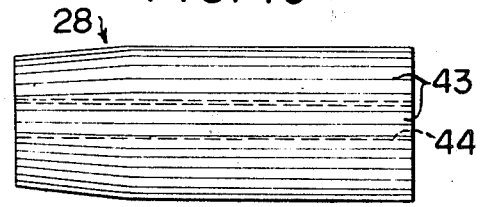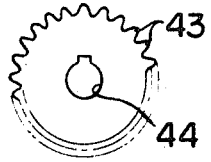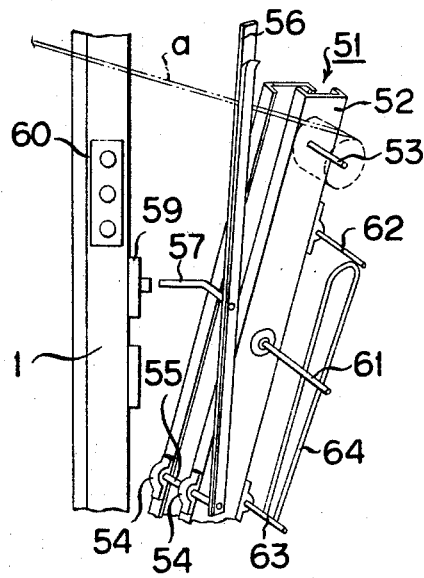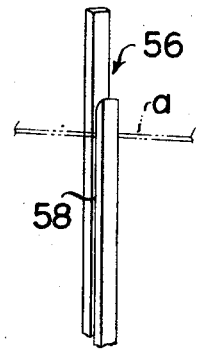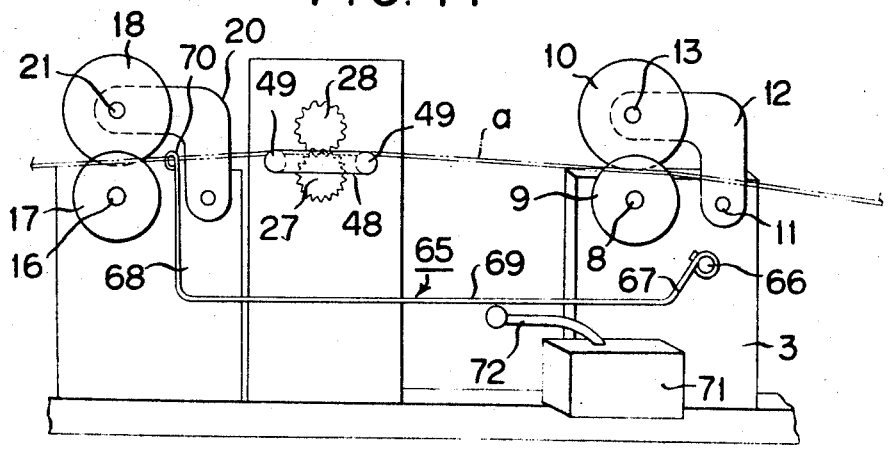

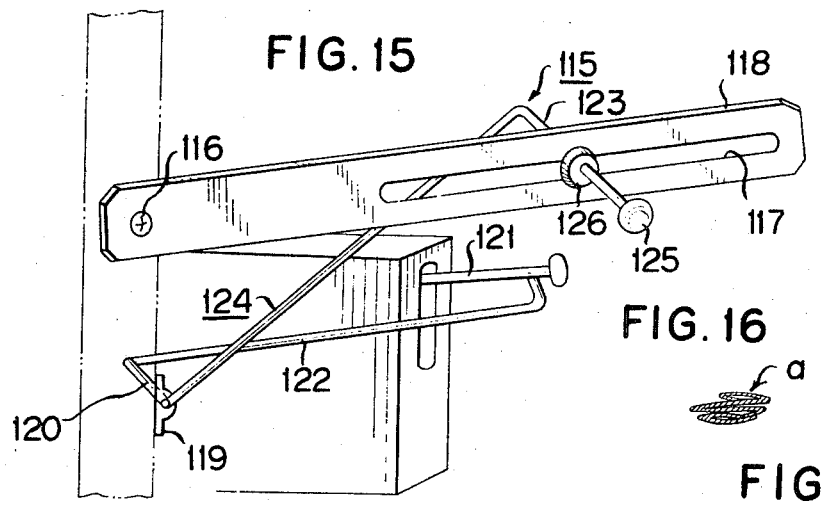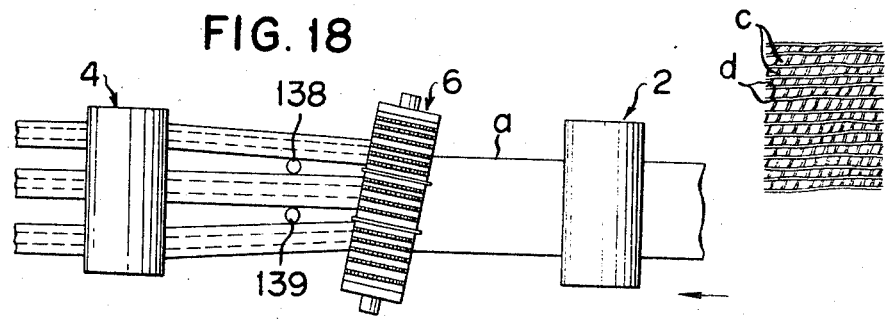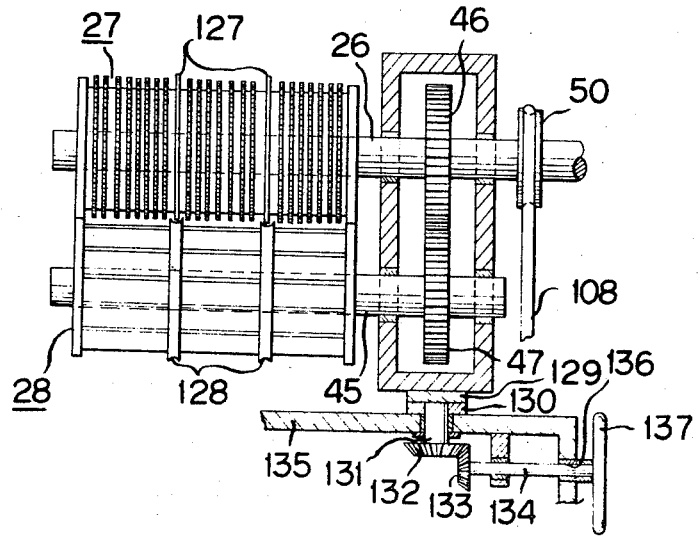

United States Patent Office

3,606,115
Patented Sept. 20, 1971

3,606,115
APPARATUS FOR PRODUCING THERMOPLASTIC RESIN SPLIT YARNS
Mitsuo Matsui, Ashikaga-shi, Japan, assignor of a fractional part interest to Mitsubishi Petrochemical Company Limited, Tokyo-to, Japan
Filed Dec. 20, 1968, Ser. No. 785,685
Claims priority, application Japan, Dec. 28, 1967, 43/83,834
Int. Cl. B26f 3/02
U.S. Cl. 225—97      16 Claims

ABSTRACT OF THE DISCLOSURE

The invention relates to an apparatus for producing a split yarn at a high speed and with a high efficiency, which split yarn has an excellent feeling, that is, its feel is soft, has warmth and is pliable to touch as well as in appearance. The split yarn is formed by passing a synthetic thermoplastic resin film or strip between a splitter, consisting of an assembly of alternately arranged coaxially disposed thin pieces spaced apart by distance pieces, and a holding member rotating independently and positively in synchronism with said splitter, whereby the strip is split.

BACKGROUND OF THE INVENTION

The present invention relates to an apparatus for producing so-called "Split Yarn" which is obtained by splitting a thermoplastic synthetic resin film or strip which has been orientated by extension in the longitudinal direction into a "split and reticulated" construction.

Heretofore, in producing split yarn by splitting a uniaxially oriented film of a thermoplastic polymer, such as polypropylene, polyester, polyethylene, etc., the film was split by uniaxial stretching, and utilizing a scratch roll or brush roll with a large number of needles on the outer periphery thereof, as a split cutter, or utilizing as a split cutter a roll having screw teeth formed on its outer periphery.

When the scratch roll or brush roll was used in the past as the split cutter, the film material was passed, in a flat and single layer form, from a feeding roll to a take-up roll, and the split cutter was positioned between the feed roll and the take-up roll, for splitting the film by piercing the pointed ends of the needles provided on the outer periphery of the split cutter through the film. In this operation, however, there were numerous disadvantages, for example, when the film material is not in a flat single layer but is folded in a disorderly manner so that, when such a sheet of film is engaged with the brush roll, it is folded many times in its sectional view, and there may be portions of the film, where the splitting is not effected, the splitting operation goes on in a quite unstable manner, and a highspeed splitting operation cannot be effected. Moreover, the pointed ends of the needles soon wear and after a short time can no longer be used. In this method, when a 1000-denier tape yarn made of polyethylene is used, the running speed is limited at about 100 meters per minute as the maximum.

Similarly, when the screw roll is used as a split cutter, and the film material is supplied in a disorderly manner, such as in a folded or gathered condition, the teeth on the screw soon become dull, which results in poor engagement between the cutter and the film and an unstable splitting operation, and further high speed operation becomes impossible. Thus a flat single sheet of film material had to be used for engagement with the screw roll. The speed of splitting a propylene film material having 1000 deniers by such a screw roll was on the order of 100 meters per minute.

Thus with the above-described conventional means, sufficient care had to be taken to feed the film material into engagement with the split cutter in a flat, single-layer state, and it was quite inconvenient to operate when the film material was presented in a folded, twisted or gathered form.

The present invention is to provide a new apparatus which makes it possible to split a thermoplastic synthetic resin film at high speed. The film is extended longitudinally, and is run with a predetermined tension, and it is fed between a splitter and a holding member which rotates independently in synchronism with the splitter. The splitter consists of an alternating engagement of a large number of coaxially disposed thin pieces each spaced apart by a distance piece for forming a toothed wheel of sorts. With this apparatus the film material need not be in a flat, single-layer form, but can be in a disorderly folded or gathered condition.

SUMMARY OF THE INVENTION

The present invention is directed to an apparatus for producing split yarn by splitting a drawn film or strip made of thermoplastic synthetic resin.

An object of the present invention is to provide an apparatus appropriate for splitting a film or strip of thermoplastic synthetic resin, which is orientated by extension in the longitudinal direction, even though the film or strip has been repeatedly folded or gathered breadthwise in a disorderly manner so that the film or strip presents a bundled form being twisted or folded in multiple layers.

Another object of the present inventon is to provide an apparatus for splitting the film or strip in a highly stable condition even when the strip is twisted or folded many times in the breadthwise direction presenting a disorderly gathered or bundled state.

A further object of the present invention is to provide an apparatus for transforming the film material into a split and reticular form by passing the film material, running with a predetermined tension, between a splitter, located between a feed roll and a take-up roll, and a holding means, whereby the material is split by the cooperation of the splitter and the holding member.

Still another object of the present invention is to provide an apparatus for splitting a film material which comprises a splitter consisting of an assembly in an alternating arrangement of a large number of disposed thin pieces each spaced apart by a distance piece for maintaining a distance between each of the thin pieces for forming a sort of a toothed wheel, and a holding member having axially arranged toothed portions, with each top portion thereof penetrating slightly into the bottom portion of the teeth formed by the thin pieces on the splitter. The splitter and the holding member rotate in synchronization with each other but not in an engaged state, such that one is a driving wheel and the other is a driven wheel. Although the crest portion of the teeth of the holding member penetrate slightly into the bottom portion of the thin pieces of the splitter, a slight gap is invariably formed between the profiles formed by the crest and bottom portions of the teeth of the thin pieces and the bottom and crest portions of the holding member, whereby the splitting is performed by passing the film material between the splitter and the holding means in the splitting mechanism while holding the film material by means of each of the toothed portions of the splitter and the holding means.

Yet a further object of the present invention is to provide an apparatus wherein by changing the inclination of the splitter and the holding means, which are positioned between the feed roll and the take-up roll for changing the intersecting angle formed substantially in the same plane as the running plane of the film material, accordingly, the length, size, arrangement of the split given to the film material can freely be selected.

Still a further object of the present invention is to provide an apparatus wherein the thickness of the members constituting the split network can be selected optionally such as thick, thin, combined thick and thin members or so, as to equalize all the members constituting the network.

Moreover, another object of the present invention is to provide an apparatus wherein by changing the inclination of the splitter and the holding member, the intersecting angle formed by the splitter with the holding means, can be changed with respect to the running axis of the film material to be split, the degree of splitting may be controlled selectively up to one-half of the distance between the adjacent thin pieces, arranged in a form of a toothed wheel on the splitter.

A further object of the present invention is to provide an apparatus wherein no replacement of the splitter and the holding member is required when the degree of splitting is to be changed, which is accomplished by changing the inclination of the splitter with the holding means as stated before.

Another object of the present invention is to provide an apparatus, wherein a safety mechanism is provided to stop the operation of the apparatus for ensuring its safety when lumps or other unfavorable foreign matter are incorporated in the film material being introduced between the splitter and the holding means.

Still another object of the present invention is to provide an apparatus wherein a safety mechanism is provided which stops the operation automatically by a breaking of film material during the operation of the apparatus.

Yet another object of the present invention is to provide an apparatus wherein slit blades are provided on the splitter, and grooved wheels corresponding to the slit blades are provided on the holding member, by means of which the desired number of split portions are obtained as the film material is split.

Moreover, another object of the present invention is to provide an apparatus wherein a split product having uniform split distances is obtained by utilizing substantially gear-wheel shaped thin pieces for the splitting operation.

EXPLANATION OF THE DRAWINGS

FIG. 1 is a front elevation showing one example of an apparatus according to the present invention;

FIG. 3 is a schematic showing of the driving system;

FIG. 6 is an elevational view, partly in section, of the splitter;

FIG. 7 is a front view of one of the gear-shaped thin pieces forming the splitter;

FIG. 8 is a developed view showing the relative position of the tip portions of the gear-shaped thin pieces of the splitter;

FIG. 9 is a front view of a distance piece;

FIG. 10 is a side elevation of the holding member;

FIG. 11 is an end view of the holding member;

FIG. 12 is a perspective view of a safety mechanism for feeding the material;

FIG. 13 is a perspective view of a guide bar of the safety mechanism;

FIG. 14 is a perspective view of a stop mechanism for operation when the film material is broken during operation;

FIG. 15 is a perspective view of an actuating mechanism for a main speed reduction device;

FIG. 16 is an enlarged sectional view showing an example of the film material;

FIG. 17 is a developed view of the film material after it has been split;

FIG. 18 is a front view showing an essential part of another example of the apparatus according to the present invention; and FIG. 19 is a side elevation showing the relative positions of the splitter and the holding means shown in FIG. 18.

DETAILED DESCRIPTION OF THE INVENTION

Figure 4:
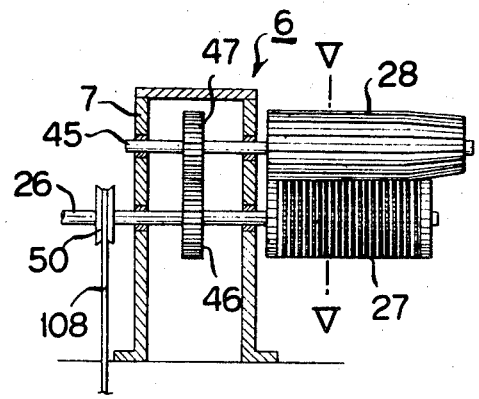
FIG. 4 is a side elevation excluding the supporting portion of the example.

The first example of the apparatus according to the present invention will now be described referring to the drawings from FIG. 1 through FIG. 17.

On the upper end of the machine frame 1 is provided a support 3 for a feed roll mechanism 2, located at the right side of the machine frame 1. On the left side of the frame 1 a support 5 for a take-up roll mechanism 4, and a support 7 for a splitting mechanism 6 are provided on the upper end of the machine frame 1 between the support 3 for the feed roll mechanism 2 and the support 5 for the take-up roll mechanism 4. The feed roll mechanism 2 is comprised of a feed roll 9 fixed at one end on a rotating shaft 8, rotatably supported on the support 3 with both of its ends projecting horizontally, and a holding roll 10 is arranged to press against the feed roll 9. The feed roll 9 is flanged and its peripheral surface is polished smooth, and the peripheral surface of the holding roll 10 is covered with rubber. The holding roll 10 is mounted on a supporting shaft 13 which is supported rotatably by the bent end of an L-shaped piece 12, the other end of the L-shaped piece 12 is pivoted at 11 on the support 3. The outer peripheral surface of the holding roll 10 is always urged against the outer peripheral surface of the feed roll 9 by the elastic force of a spring 14, and, when necessary, the holding roll 10 is separated from the feed roll 9 by rotating the L-shaped piece 12, with the pivot 11 as the center, against the elastic force of the spring 14. A pulley 15 is mounted at the projected end of the rotating shaft 8 supported rotatably by the support 3.

The take-up roll mechanism 4 is comprised of the take-up roll 17 fixed at one end of a rotating shaft 16, which is rotatably supported on the support 5 with both of its ends projecting horizontally, and a holding roll 18 pressing against the take-up roll 17. The take-up roll 17 is flanged and its peripheral surface is polished smooth. The peripheral surface of the holding roll 18 is coated with rubber. The holding roll 18 is mounted on a supporting shaft 21 supported rotatably on the end of an L-shaped piece 20, and the other end of the L-shaped piece 20 being pivoted at 19 on the support 5. The outer peripheral surface of the holding roll 18 is biased against the outer peripheral surface of the take-up roll 17 by the elastic force of a spring 22, and when necessary, the holding roll 18 is separated from the take-up roll 17 by rotating the L-shaped piece 20, about the pivot point 19 against the elastic force of the spring 22. A pulley 23 is fixed at the other end of the rotating shaft 16 projecting from the support 5. In this case, a horizontal lever 24 is provided with one end pivoted to the L-shaped piece 12 and the other end pivoted to the L-shaped piece 20, and the intermediate portion of a grip lever 25 is pivoted to the end portion of the horizontal lever 24, the lower end of the grip lever 25 is pivoted on the support 5. By rotating the grip lever 25 in the clockwise direction, the holding rolls 10, 18 are separated simultaneously from the corresponding feed roll 9 and the take-up roll 17.

The splitting mechanism 6 is comprised of a splitter 27 fixed on a rotating shaft 26 rotatably supported on the support 7 with both ends projecting horizontally, and a holding member 28 rotating independently of and in synchronism with the splitter 27. As shown in FIG. 4 to FIG. 9, the splitter 27 is made up of a holding cylinder 29, a number of thin pieces 30, each having a toothed-wheel form, fitted on the outer periphery of the holding cylinder 29, distance pieces 31, fitted on the holding cylinder and each distance piece spacing a pair of adjacent thin pieces 30, a predetermined distance apart, and a pair of end plates 32, 32, each located at an opposite end of the assembly of the thin pieces and distance pieces.

The inner diameter of the holding cylinder 29 is determined so that it fits on the rotating shaft 26, and peripheral grooves 33, 33 are formed on both end portions of the holding cylinder 29 so that stop rings 34, 34 can be fitted in the peripheral grooves 33, 33.

The thickness of each gear shaped thin piece 30, note FIG. 7, is about 0.3 mm. Each thin piece 30 has a hole 35 at the center for engagement on the outer periphery of the holding cylinder 29. A radial cut 36 extends outwardly from the hole 35 to the periphery of the thin piece, and a keyway 37 is formed in the periphery of the hole opposite the radial cut. Formed continuously on the outer periphery of each thin piece 30 are twenty toothed portions 38, providing a gear configuration to the thin piece. The shape of each of the teeth portions is neither involute nor cycloid in shape, and its tip end or tooth top is pointed.

The distance piece 31 is an annular plate, as shown in FIG. 9, having an outer diameter approximately equal to that of the dedendum circle of the thin pieces 30, and the inner diameter of the central hole is determined so as to fit on the outer periphery of the holding cylinder 29. A radial cut 39 is forced in the distance piece 31 from its central hole to its periphery, and a keyway 40 is provided opposite the radial cut, the thickness of the distance piece is 0.5 mm.

The end plates 32, 32 are annular in shape, and threaded holes 41 are formed in each end plate at equal spacings in a direction of the thickness and at equidistance radially. These threaded holes 41 receive adjusting screws 42, 42, respectively.

The assembly of the splitter 27 is as follows: a stop ring 34 is fitted in the peripheral groove 33 formed at one end of the holding cylinder 29. Next, one of the end plates 32 is fitted from the other end of the holding cylinder 29 against the stop ring. In the same manner, a distance piece 31 is placed on the holding cylinder and abutted against the end plate. Then gear-shaped thin pieces 30 and distance pieces 31 are fitted alternately over the holding cylinder 29. After the required number of thin pieces 30, spaced by distance pieces 31, are fitted on the holding cylinder, another end plate 32 is placed on the opposite end of the holding cylinder 29, and the assembly is completed by fitting another stop ring 34 in the peripheral groove 33 adjacent the last-placed end plate for locking the end plate in place.

The splitter 27 thus assembled is further adjusted as follows: adjusting screws 42 are screwed into the threaded hole 41, formed in the end plates 32, 32 mounted on both ends of the splitter 27. In advancing and retreating these adjusting screws 42, 42, the phase between each of the tooth-formed portions 38, 38 of each of the thin pieces 30, 30 is shifted by the distance between the tooth-formed portions 38, 38 of the adjacent thin pieces 30, 30, spaced by the distance pieces 31, in one peripheral revolution. However, even if each of the tooth-formed portions 38 is displaced by the distance between the tooth-formed portions 38, 38 of each of the adjacent thin pieces 30, 30 in one peripheral revolutoin, the crest portions of the tooth-formed portions 38 of each of the thin plates 30 are aligned in a straight line in the axial direction, and, accordingly, the bottom portions of each of the tooth-formed portions 38 are also on line in the axial direction (see FIG. 8).

The holding means 28 is provided with 20 tooth-formed portions 43 on the outer periphery, as shown in FIGS. 10 and 11, corresponding to the splitter 27, and presenting male serrations, and is formed with a centered inserting hole 44. The inserting hole 44 of the holding member 28 serves to fit the holding member 28 on a rotating shaft 45 which projects from said support 7 and is supported rotatably and disposed parallel to the rotating shaft 26.

The tip ends of tooth-formed portions 43 of the holding means 28 are not pointed but are rounded.

The splitter 27 formed as stated above and the holding means 28 are arranged, as shown in FIG. 4, to constitute a splitting mechanism 6. Thus the rotating shafts 26, 45 projecting from the support 7 are disposed in parallel and their axes are disposed one above the other in the same vertical plane. A spur gear 46 is fixed on the rotating shaft 26, and the splitter 7 is mounted on one end of the shaft 26 projecting outwardly from the support 7. Another spur gear having the same number of teeth as that of spur gear 46, is secured on the rotating shaft 45, and the holding member 28 is positioned on the end of the shaft 45 which projects outwardly from the support 7. Therefore, the splitter 27 and the holding means 28 rotates by means of spur gears 46, 47. The relative condition of the tooth-formed portions 38 of the gear-shaped thin piece 30 of the splitter 27 and the tooth-formed portions 43 of the holding member 28 does not have the tooth-formed or crest portion of one penetrating deeply into the bottom portion of the other and contact while rotating, as in the case of gear meshing of so-called general gear transmission mechanism where the transmitting rotation is effected while each of the pitch circles of meshing gears makes contact, takes place under a predetermined pressure angle. The holding member 28 is rotated synchronously with the splitter 27 such that there is enough space left to place a film material between each tooth-formed portion 43, on the holding member 28 and each tooth-formed portion 38 on the splitter. In other words, as distinguished from gear mechanisms, the holding member 28 and the splitter are not engaged in such a meshed relationship that one is a driving gear and the other is a driven or following gear. Although the crest portion of the tooth-formed portion 38 of the thin piece 30 is in a state that it penetrates slightly into the bottom portion of the tooth-formed portion 43 of the holding member 28, there is formed always a slight clearance between the profiles formed by the crest and bottom portions of the tooth-formed portion 38 of the thin piece 30 and the bottom and crest portions of the tooth-formed portion 43 of the holding member 28.

A guide member 48 is formed on and projects from the support 7 of the splitting mechanism 6, see FIGS. 1 and 14. This guide member 48 has parallel portions 49, 49, which are disposed near a part where the splitting action by the splitter 27 and the holding member 28 takes place.

The number of revolutions of the feed roll 9 of the feed roll mechanism 2 is slightly less than that of the take-up roll 17 of the take-up mechanism 4. It is preferable that the abutting portion of the feed roll 9 and the holding roll 10 in the feed roll mechanism 2, the splitting portion of the splitter 27 and the holding member 28 in the splitting mechanism 6, and the abutting portion of the take-up roll 17 and the holding roll 18 in the take-up mechanism 4 are substantially in the same horizontal plane, or the splitting portion by the splitter 27 and the holding member 28 is positioned slightly above the horizontal plane formed by the abutting portion of the feed roll 9 and the holding roll 10, and the abutting portion of take-up roll 17 and the holding roll 18. A pulley 50 is secured on the opposite end of the rotating shaft 26 from the end supporting the splitter 27 of the splitting mechanism 6. On the side of the feed mechanism 2 on the machine frame 1, there is provided a feed safety mechanism 51 which prevents the film material from being fed into the split mechanism when the film material contains blocks, local twistings or entanglements, or the other matters which would be unfavorable when introduced into the splitting mechanism.

The safety mechanism 51 is constituted as shown in FIGS. 12 and 13. Thus an inclined upwardly directed frame 52 is provided near the machine frame 1, and adjacent the upper end of the inclined frame 52, a mounting shaft 53 is rotatably arranged for mounting the film material. A supporting shaft 55 is supported horizontally and rotatably by bearings 54, 54, and a guide bar 56 is mounted with its lower end fixed on a projecting end of the supporting shaft 55. The guide bar 56 is provided with a bell-crank push rod 57 for switching at its central portion, and a clearance 58 is also formed for passing the film material. The clearance 58 gives no effect on the guide bar 56 when the film material passes with a uniform thickness, but when the film material includes blocks, local entanglements or other local unfavorable matters, it causes the guide bar 56 to swing towards the machine frame 1, with the supporting shaft 55 as the center, actuated by said unfavorable matters, and the switch push rod 57 actuates a switch 59 provided on the machine frame 1, causing the operation of the apparatus to stop. A manual switch 60 is also provided on the machine frame 1. The inclined frame 52 is provided with shafts 61, 62, 63, and a guide rod 64 is provided on the shaft 63. These shafts 61, 62, 63 and the guide rod 64 are all intended for smooth feeding of the film material, when it is in a cheese form and in a traverse winding, to be mounted on the mounting shaft 53.

Figure 2:
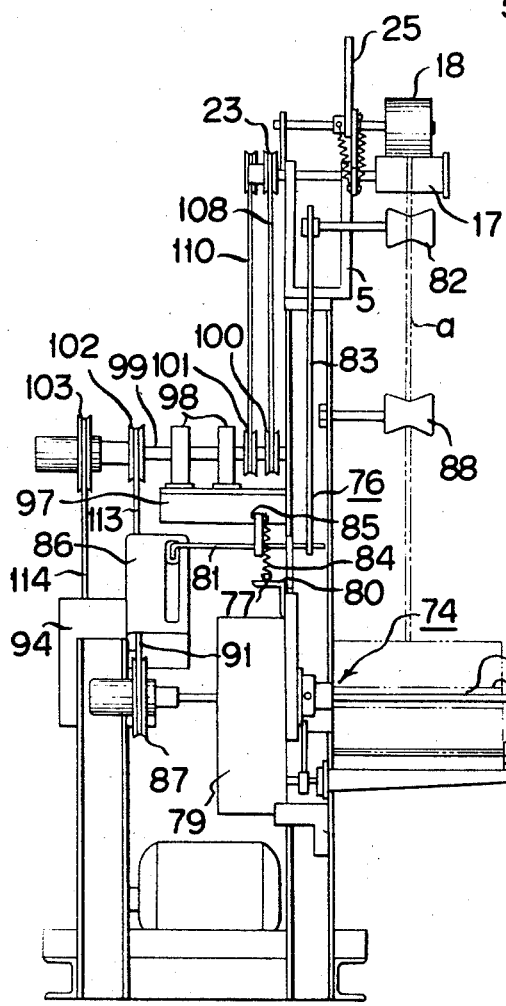
FIG. 2 is a left-side elevation of FIG. 1.
Figure 5:
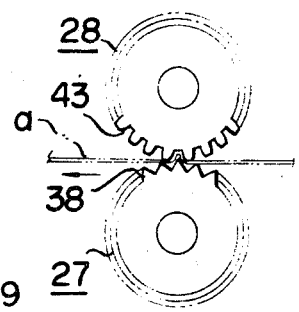
FIG. 5 is a cross sectional view taken along the line V—V in FIG. 4, showing the relative position of the splitter and the holding member, especially a related condition of each of the toothed portions of the splitter and the holding member and the state in which the film material is split.

The present apparatus is also provided with a stop mechanism 65 for stopping the operation of the apparatus when the film material to be split is broken during the feeding and winding operation. The stop mechanism 65 is constituted as shown in FIG. 14. A bent portion 67 at one end of an actuating rod 69 is pivoted on a pin 66 provided on the front face of the support 3 for the feed roll mechanism 2, and another bent portion 68 at the opposite end of the actuating rod 69 is positioned near the take-up roll 17 and the holding roll 18 of the take-up roll mechanism 4. A ring portion 70 is formed on the tip end of the bent portion 68, and the film material is passed through the ring portion 70. Thus, when the film material supports the actuating rod 69 in a stretched state between the feed roll mechanism 2 and the take-up mechanism 4, the lower surface of the actuating rod 69 is adapted to contact a contact member 72 of a limit switch 71 provided on the machine frame 1. While on the other hand, when the film material is displaced from the inside of the ring portion 70, the actuating rod 69 swings downwardly about the pin 66, on which the bent end 67 is pivoted, as the center, so that the limit switch 71 is actuated by the contact 72 and the operation of the apparatus is stopped. A winding mechanism 73 is provided on the take-up side of the machine frame 1. As shown in FIGS. 1, 2 and 3, the winding mechanism 73 comprises a driving means 74 for a winding shaft 75, and a speed reducing means 76 to reduce the speed of the winding shaft 75 of the driving means 74 in response to the winding condition. Further, a casing 79 is provided for rotatably supporting the winding shaft 75, with the upper and lower portions of the casing 79 respectively fixed on the frame portions 77, 78 of the machine frame 1. In the present example, the drive means 74 of the winding shaft is provided with a means for winding the split film in a traverse form.

The speed reducing means 76 comprises an actuating rod 83, the lower end of which is fixed on a shaft 81 through which the upper end of a support piece provided on the support 77 is rotatably passed. On the upper end of the actuating rod 83 there is mounted rotatably a roller 82. A pin 85 is fixed on a shaft 81 at its lower end and a spring 84 is attached to its upper end, the other end of the spring 84 is mounted on the support 80. A speed reducer 86 is connected to the end portion of the winding shaft 75. A roller 88 is mounted rotatably on the machine frame 1. Prior to being wound on a spool 89 fitted on the winding shaft 75, the split film passes over rollers 82, 88 as it travels from the take-up roll mechanism 4. The total length of the film material, that is the sum of the length from the take-up roll mechanism 4 to the roller 82, the length from the roller 82 to the roller 88, and the length from the roller 88 to the contact point on the spool 89, decreases gradually in accordance with the gradual increase in the quantity wound on the spool 89 and with the diameter of the wound material, so that the upper portions of the actuating rod 83 is drawn towards the machine frame 1 by means of the split film passing over the roller 82, and with the passed-through portion of the shaft 81 as the center. With such a movement of the actuating rod 83, the shaft 81 itself, which is fixed at the lower end of the actuating rod 83, rotates slightly and actuates the reducer 86 with its tip end, and reduces the speed of the winding shaft 75 through a pulley 90 of the reducer and through a belt 91 passing over the pulley 90 and the other pulley 87. In this way, the winding is effected very smoothly by the reduced speed of the winding shaft 75 corresponding immediately with the increased diameter of the split film wound on the spool 89, thus no breakage of film is assured in this stage.

The driving system of the present apparatus will now be described referring to FIG. 3. At the lower portion of the machine frame 1, an electric motor 92 is provided. A pulley 93 is secured on the shaft of the motor 92. A belt 96 is passed over a pulley 95 of a reducer 94 and over the pulley 93. Pulleys 100, 101 are fixed on one end of a transmission shaft 99 supported by and projecting outwardly from bearings 98, 98 provided on a frame 97 of the machine frame 1, and pulleys 102, 103 are fixed on the other end of the transmission shaft 99. A belt 108 passes, in turn, over the pulley 23 fixed on the rotating shaft 16 on which the take-up roll 17 is mounted over the pulley 50 fixed on the rotating shaft 26 on which the splitter 27 is mounted over a tension pulley 107 mounted rotatably on one end of a swingable piece 106, the other end 105 of which is pivoted on a supporting piece 104 provided on the upper portion of the machine frame 1 and then over pulley 100. A belt 110 passes in turn, over the pulley 101, the pulley 15 fixed on the rotating shaft 8 on which said feed roll 9 is mounted, and the tension pulley 109. The intermediate portion of a weight bar 111, which actuates the swingable piece 106 in the tensioning direction, is fixed on the swingable piece 106.

Another belt 113 passes, in turn, over the pulley 102 fixed on the transmission shaft 99, the pulley 90 of the reducer for the winding shaft 75, and the tension pulley 112. A belt 114 passes, in turn, over the pulley 103 fixed on the transmission shaft 99, and the pulley 95 of the reducer 94. Actuating mechanism 115 of the reducer 94 is constituted as shown in FIG. 15. An elongated guide rod 118 is provided with one end thereof pivoted on a pin 116 secured on the machine frame 1, while the other end is free and has an elongated hole 117; a transmission rod 122 is provided with one end fixed on one projecting end of a shaft 120 pivoted on a bearing 119 fixed on the machine frame 1 while the other end is fixed on an actuating rod 121 of the reducer 94; a lever 124 is provided with its lower end fixed on the other projecting end of the shaft 120 and its upper bent portion 123 is inserted through the elongated hole 117; a grip portion 125 is formed on the tip end of the lever 124 extending through the hole 117, and a stopper 126, abutting the front surface of the elongated hole 117 of the guide rod 118, is fixed on the bent portion 123.

Splitting the film material $a$ is accomplished by using the above-described apparatus. The film material $a$, a thermoplastic synthetic resin film, such as produced by inflation technique or T-die technique, is formed into a long slitted film having a narrow slit width in the lengthwise direction, and the slitted film is oriented by extension, and when it is wound in a cheese form, it is folded in many layers in the breadthwise direction and is twisted. A section taken at an optional point in the film material $a$ is shown in FIG. 16, and it is folded over in the breadthwise direction in a disorderly and irregular manner. A cheese $b$ wound with such film material $a$ is placed on the mounting shaft 53, and the film material $a$ is passed through the clearance 58 of the guide bar 56, and then passes between the feed roll 9 and the holding roll 10. Next, the film material passes between the splitter 27 and the holding means 28 and over a guide member 49, and further it passes between the take-up roll 17 and the holding roll 18, then, in turn, over the roll 82 at the upper end of a swing rod 80, and the roller 88, and finally the leading end of the film material $a$ is wound on the spool 89 mounted on the winding shaft 75. The film material $a$, wound in a cheese form, is adapted to be successively delivered by the means of the feed roll 9 and the holding roll 10. The winding speed of the winding shaft 75 is operated in synchronism with the take-up speed of the take-up roll 17 and the holding roll 18. Further, the take-up speed of the take-up roll 17 and the holding roll 10 is selected slightly greater than the feeding speed of the feed roll 9 and the holding roll 10 so as to tension the film material $a$. The rotating speed of the splitter 27 has a predetermined rate with respect to the rotating speed of the take-up roll 17.

Thus, when the electric motor 92 is energized, the transmission shaft 99 is rotated by the belt 96 passing over the pulley 93, and pulley 95 and by the belt 114 passing over the pulleys 95 and 103. The rotating shaft 8 is rotated by the belt 110 passing over the pulley 15, pulley 101 fixed on the transmission shaft 99 and pulley 109. The shaft 8 rotates the feed roll 9 to operate the feed mechanism 2. Also the rotating shaft 16 is rotated by the belt 108 which passes over the pulley 23, the pulley 100 fixed on the transmission shaft 99, pulley 50 on shaft 26 and the tension pulley 107. The rotating shaft 16 rotates the take-up roll 17 mounted on the rotating shaft 16, and at the same time the belt 108 rotates the rotating shaft 26 through the pulley 50 through belt 108, which, in turn, rotates the splitter 27. Accordingly, the film material $a$ is delivered from the feed roll 9 which is driven relatively slower and is taken up by the take-up roll 17 which is driven relatively faster, thus the film material runs with a predetermined tension. The film material $a$ running in this state is split by the cooperating action of the tooth-formed portions 38 on the gear-shaped thin pieces 30 of the splitter 27 and the tooth-formed portions 43 of the holding means 28 corresponding with the tooth-formed portions 38. Thus, at the same time the tip end of the crest portion of the tooth-formed portion 38 formed by the gear-shaped thin pieces 30 of the splitter 27 is abutted with the film material $a$, the top end of the crest portion of the tooth-formed portions 43 of the holding member 28 holds the film material $a$, and the material is split by the pointed end of the tooth-formed portion 38 of the thin piece 30, so that the pointed end of the crest portion of the splitter 27 will not pierce through the film material $a$ deeply, and rents $c$, note FIG. 17, are provided each time the pointed end of the crest portion of the splitter 27 abuts the material $a$. Moreover, although each pointed end of the crest portion of the tooth-formed portion 38 of each of the thin pieces 30 in the splitter 27 is aligned in axial direction, each pointed end is arranged slightly out of phase along the periphery and in the direction of the width, so that the rents $c$, formed by the tooth-formed portions of the thin pieces 30 do not continue in the lengthwise direction, accordingly there is no fear of slitting the material $a$ at the same lengthwise portion. Thus the split film material $a$ becomes a so-called "Split-yarn" and is wound up on the spool 89.

When the apparatus is operating to split such a film material $a$, if the material having unfavorable matter, such as blocks or entanglements, is delivered from the cheese form, such blocks or entanglements are unable to pass through the clearance 58 of the guide bar 56, and the blocks, entanglements or such other unfavorable matter cause the guide bar 56 to swing and push the switch 59 to stop the operation of the apparatus.

Also, if the film material $a$ is broken inadvertently during operation, as described above, the actuating rod 69 swings downwardly to operate the limit switch 71 and the operation is stopped. Furthermore, with the present apparatus, the rotation of the winding shaft 75 is reduced in response to the change in length of the split film from the feed roll 17 to the point of tangential contact with the wound diameter on the spool 89 mounted on the winding shaft 75, so that the peripheral speed of the winding is kept constant, and the winding speed is also made constant, thus the breakage of the split film is prevented in advance, and which forms a feature of the present apparatus.

FIG. 17 shows the state of the split film with its width spread. Thus the rents $c$ present reticular splits or a split network and are substantially of uniform shapes, and the members $d$, forming the network are relatively thin. In this way, the film material $a$ is split uniformly all over its width even when the film material $a$ is folded many times in the breadthwise direction in a disorderly and irregular manner.

Next, the second embodiment of the present invention will be described referring to FIGS. 18 and 19. The distinguishing feature of this embodiment resides in the arrangement of the splitter 27 and the holding member 28 for swinging integrally so as to be disposed at an oblique angle in a horizontal plane with respect to the running plane of the film material $a$. Also, another feature is that a required number of slit blades 127 are mounted on such a splitter 27, and a corresponding number of grooved wheels 128 are provided on the holding member 28.

An abutting member 129 is formed on the lower face of the support 7 for the split mechanism 6, and a shaft 131 depends from the abutting member 129. A receiving member 130, which is provided on the machine frame 1, encircles the shaft 131. Secured to the lower end of the shaft 131 is a bevel gear 132 and another bevel gear 133 supported on the end of an adjusting shaft 134 engages the bevel gear 132. The adjusting shaft 134 extends through a through hole 136 formed in a supporting piece 135 which is suspended from the machine frame 1. On the end of the adjusting shaft 134, opposite the bevel gear, a handle 137 is fixed by which the support 7 can be rotated for orienting the splitter 27 and the holding member 28 at a required angle. In this manner, the length, size and arrangement of the rents $c$, formed in the film material, can be selected freely, and the size of the members constituting the split network can be selected at will thick, thin, or a combination of thick and thin, as well as to have substantially the same size of the members of the reticulated film material. Thus, by changing the intersecting angle formed between the contacting portions of the splitter 27 and the holding member 28 and the running axis of the film material $a$, the degree of splitting can be controlled at will up to at least one half of the distance between the tooth-formed thin pieces 30 of the splitter.

Furthermore, by providing a required number of slit blades 127 on the splitter, a corresponding number of grooved wheels 128 on the holding member 28, and branch guide members 129, 130, the film material $a$ can be slitted at the same time it is split. In this way, the splitting operation may be continued even when the inclination angle of the split mechanism 6 is changed while operating the apparatus to run the film material $a$.

Also, when the inclination angle is increased to its maximum, a combing effect is produced which forms a napped product, and a split film having a feeling of spinning yarn may be obtained.

In FIGS. 18 and 19, the members which are the same as those members shown in FIGS. 1–17, are designated by the same numerals as those used in FIGS. 1–17.

Favorable examples of the present invention have been described above; however, it is to be understood that the invention is not limited to such examples, and various changes and modifications of design may be practicable without departing from the spirit and scope of the present invention. The split yarn thus produced is used for material, for textile, knitting or rope making or binding material as it is.

What is claimed is:

1. Apparatus for splitting synthetic thermoplastic resin film folded in an irregular manner comprising, in combination, a rotatable cylindrically-shaped splitter, a rotatable cylindrically-shaped holding member having its axis disposed in parallel relationship with the axis of said splitter, the circumferential periphery of each of said splitter and holding member having a dentate configuration with said splitter and holding member arranged to rotate in partly meshed engagement, said splitter comprising a plurality of annular-shaped thin pieces disposed transversely of the axis of said splitter and a plurality of annularly-shaped distance pieces each separating a pair of adjacent said thin pieces, said thin pieces having a larger diameter than said distance pieces so that the periphery of said thin pieces extends outwardly beyond the periphery of said distance pieces, the dentate configuration of said splitter being formed by said thin pieces having continuous teeth formed on the periphery thereof, the dentate configuration of said holding member comprising axially extending spaced teeth formed on the circumferential periphery of said holding member, said teeth on said thin pieces of said splitter and on said holding member arranged to mesh with the crown portions thereof being spaced from the base of the spaces between said teeth so that the irregularly folded film can be passed therebetween, means for passing the film between said splitter and holding member at a predetermined tension, and means for rotating said splitter and holding member synchronously and the synchronous rotation of said splitter and said holding member being separate from the meshed arrangement of said teeth thereon, whereby as the film is held by said holding member it is split by said teeth on said thin pieces of said splitter.

2. Apparatus, as set forth in claim 1, wherein said thin pieces having a centrally disposed opening and a radial cut extending from said opening to the peripheral circumference thereof, and said distance pieces having a centrally disposed opening therein and a radially extending cut extending from said opening therein to the circumferential periphery thereof.

3. Apparatus, as set forth in claim 2, wherein said teeth on said thin pieces having a pointed crown and the sides of said teeth diverging inwardly and intersecting the adjacent sides of said adjacent teeth at the base of the spaces between said teeth.

4. Apparatus, as set forth in claim 3, wherein said distance pieces having an outside diameter approximately equal to the dedendum circle of said thin pieces.

5. Apparatus, as set forth in claim 4, wherein said splitter comprises an axially elongated holding cylinder, a peripheral groove formed in the circumferential surface of said holding cylinder adjacent each of its ends, said thin pieces and said distance pieces disposed in alternating arrangement on said holding chamber between said peripheral groove, one of said distance pieces being located at each end of said assembly of said thin pieces and distance pieces, an end plate positioned against each end of said assembly of thin pieces and distance pieces, and a stop ring fitted in each of the peripheral grooves in said holding chamber.

6. Apparatus, as set forth in claim 1, wherein said means for passing the film between said splitter and holding member at a predetermined tension comprising a feed roll mechanism positioned on one side of said splitter and holding member, a take-up roll mechanism positioned on the opposite side of said splitter and holding member, and means for driving said feed roll mechanism and take-up roll mechanism for driving said take-up roll mechanism at a slightly greater speed than said feed roll mechanism for tensioning the film as it passes between said splitter and holding member.

7. Apparatus, as set forth in claim 1, wherein said means for synchronously driving said splitter and holding member comprising a first shaft fitted into said splitter for imparting rotation thereto, a second shaft disposed in parallel relationship with said first shaft and fitted into said holding member for imparting rotation thereto, a first spur gear fixed on said first shaft, a second spur gear having the same number of teeth as said first spur gear fixed on said second shaft and disposed in meshed engagement with said first spur gear, and means engageable with said first shaft for rotating said splitter whereby said holding member is rotated synchronously therewith through said first and second spur gears.

8. Apparatus, as set forth in claim 1, characterized therein that a speed safety mechanism is provided for the film fed between said splitter and said holding member, said feed safety mechanism comprising a pivotally mounted guide bar member arranged to pass the film therethrough with a clearance for the film, a switch push rod fixed on said guide bar, and a switch disposed opposite said switch push rod whereby as the film passes through said guide bar any blocks, entanglements and the like in the film incapable of passing through the clearance in said guide bar causes said guide bar to be pivoted so that said switch push rod contacts said switch and stops the feed of the film to said splitter and holding member.

9. Apparatus, as set forth in claim 1, characterized therein that a stopping mechanism is provided for discontinuing operation, said stopping mechanism comprises an elongated actuating rod extending in the direction of feed of the film through the apparatus, a pin positioned adjacent the end of said actuating rod and said actuating rod being pivotally positioned on said pin, a bent portion of said actuating rod located on the opposite end thereof from said pin, a ring portion formed on the free end of said bent portion, and a limit switch disposed adjacent to said actuating rod, whereby the film is arranged to pass through said ring portion on the tip portion of said actuating rod for supporting said actuating rod, and when the running film is broken during operation the support provided said actuating rod is discontinued and said actuating rod operates said limit switch for discontinuing operation of the apparatus.

10. Apparatus, as set forth in claim 1, characterized therein that a winding adjusting mechanism is arranged for the split film after its passage between said splitter and said holding member, said winding adjusting mechanism comprising a take-up roll, a roller positioned between said take-up roll and said splitter for guiding the split film therebetween, an actuating rod secured at its upper end to said roller, a speed reducer, a shaft fixed to the opposite end of said actuating rod from said roller and extending angularly therefrom, the end of said shaft spaced from said actuating rod being disposed in actuating engagement with said speed reducer, a winding shaft fitted into said take-up roll, a pulley mounted on said winding shaft, a belt arranged to drive said pulley and to be driven by said speed reducer, whereby the rotational speed of said take-up roll is automatically adjusted in response to the change in length between said take-up roll and a predetermined point located between said take-up roll and said splitter.

11. Apparatus, as set forth in claim 1, characterized therein that means are arranged for angularly displacing said splitter and holding member at an oblique angle to the axis of travel of the film therebetween for varying the splitting action thereon.

12. Apparatus, as set forth in claim 11, wherein said means for angularly displacing said splitter and holding member comprising a support member for said splitter and said holding member, a shaft secured to said support member, a bevel gear secured to the opposite end of said shaft from said support member, a support frame, a second bevel gear mounted on said support frame and engaged with said bevel gear on said shaft for angularly displacing said support member and thereby said splitter and holding member relative to the axis of travel of the film.

13. Apparatus, as set forth in claim 11, characterized therein that at least one slit blade is positioned on said splitter in parallel relationship with said thin pieces and distance pieces and being positioned intermediate the ends of said splitter between a pair of said distance pieces, said holding member having a grooved wheel formed therein corresponding to each said slit blade on said splitter.

14. Apparatus, as set forth in claim 11, characterized therein that a speed safety mechanism is provided for the film fed between said splitter and said holding member, said feed safety mechanism comprising a pivotally mounted guide bar member arranged to pass the film therethrough with a clearance for the film, a switch push rod fixed on said guide bar, and a switch disposed opposite said switch push rod whereby as the film passes through said guide bar any blocks, entanglements and the like in the film incapable of passing through the clearance in said guide bar causes said guide bar to be pivoted so that said switch push rod contacts said switch and stops the feed of the film to said splitter and holding member.

15. Apparatus, as set forth in claim 11, characterized therein that a stopping mechanism is provided for discontinuing operation, said stopping mechanism comprises an elongated actuating rod extending in the direction of feed of the film through the apparatus, a pin positioned adjacent the end of said actuating rod and said actuating rod being pivotally positioned on said pin, a bent portion of said actuating rod located on the opposite end thereof from said pin, a ring portion formed on the free end of said bent portion, and a limit switch disposed adjacent to said actuating rod, whereby the film is arranged to pass through said ring portion on the tip portion of said actuating rod for supporting said actuating rod, and when the running film is broken during operation the support provided said actuating rod is discontinued and said actuating rod operates said limit switch for discontinuing operation of the apparatus.

16. Apparatus, as set forth in claim 11, characterized therein that a winding adjusting mechanism is arranged for the split film after its passage between said splitter and said holding member, said winding adjusting mechanism comprising a take-up roll, a roller positioned between said take-up roll and said splitter for guiding the split film therebetween, an actuating rod secured at its upper end to said roller, a speed reducer, a shaft fixed to the opposite end of said actuating rod from said roller and extending angularly therefrom, the end of said shaft spaced from said actuating rod being disposed in actuating engagement with said speed reducer, a winding shaft fitted into said take-up roll, a pulley mounted on said winding shaft, a belt arranged to drive said pulley and to be driven by said speed reducer, whereby the rotational speed of said take-up roll is automatically adjusted in response to the change in length between said take-up roll and a predetermined point located between said take-up roll and said splitter.

References Cited

UNITED STATES PATENTS

| | | | |
|---|---|---|---|
| 2,029,726 | 2/1936 | Laabs | 83—66 |
| 2,501,334 | 3/1950 | Hubelmeyer | 83—66 |
| 2,541,737 | 2/1951 | Bardsley et al. | 83—66UX |
| 3,035,497 | 5/1962 | Whitehead et al. | 225—93X |
| 3,147,931 | 9/1964 | Cohen | 242—45 |
| 3,353,762 | 11/1967 | Baselice | 242—45 |
| 3,426,630 | 2/1969 | McCaskill et al. | 83—66 |
| 3,427,654 | 2/1969 | Rasmussen | 225—93X |
| 3,496,259 | 2/1970 | Guenther | 225—3X |

FRANK T. YOST, Primary Examiner

U.S. Cl. X.R.

28—Dig.1; 83—66, 73; 225—93